US005971345A

United States Patent [19]

Khalaf

[11] Patent Number: 5,971,345

[45] Date of Patent: Oct. 26, 1999

[54] UNIVERSAL ANTENNA MOUNTING SYSTEM

[75] Inventor: Belal F. Khalaf, Arlington, Tex.

[73] Assignee: Lucent Technologies Inc., Murray Hill, N.J.

[21] Appl. No.: 09/075,480

[22] Filed: May 11, 1998

[51] Int. Cl.[6] ........................... F16M 13/00; A01K 97/10

[52] U.S. Cl. .......................... 248/512; 248/514; 248/539; 248/540; 343/890; 343/892; 343/882

[58] Field of Search .................................... 248/511, 512, 248/514, 534, 538, 539, 540; 343/890, 892, 757, 758, 882, 891

[56] References Cited

U.S. PATENT DOCUMENTS

| | | | |
|---|---|---|---|
| 4,799,067 | 1/1989 | Tekip et al. | 343/890 |
| 5,467,955 | 11/1995 | Beyersmith | 248/219.3 |
| 5,787,673 | 8/1998 | Noble | 52/726.1 |
| 5,835,068 | 11/1998 | Paul et al. | 343/757 |

OTHER PUBLICATIONS

Andrew Drawing # MI–00–83 titled "Universial Cellular Mount Assy W/Tilt Assy"; Andrew Corp, Dec. 1992.

Andrew brochure "Universal Cellular Mount"; Andrew Corp.

Andrew Catalog No. 37, p. 639 (undated).

*Primary Examiner*—Derek J. Berger
*Assistant Examiner*—Michael Nornberg

[57] ABSTRACT

A universal antenna mounting system includes a grid-like mounting frame on which the antenna is installed. A mounting pipe is secured to a tower leg at a desired height and the mounting frame is then secured to the mounting pipe. The mounting connections are all frictional in nature and the mounting frame is adjustable in azimuth about the mounting pipe so that the antenna can be pointed in the right direction. Side struts secured to the mounting frame and the tower maintain the mounting frame at the desired azimuth.

21 Claims, 5 Drawing Sheets

UNIVERSAL ANTENNA MOUNTING SYSTEM

BACKGROUND OF THE INVENTION

This invention relates to antenna installation and, more particularly, to an improved system for mounting an antenna on a tower.

Cellular communications antennas are typically mounted on towers so that they are elevated above ground level to increase their line-of-sight range. Such an antenna is highly directional and therefore must be pointed in a very specific direction. If the antenna is mounted on a tower, the angular orientation of the tower may not be in the specific direction required by the antenna. This is especially true when the tower is preexisting. It would therefore be desirable to have an antenna mounting arrangement which is angularly adjustable in a horizontal plane to accurately point the antenna in a desired direction.

It would also be desirable to have an antenna mounting system which can be installed at any desired height on a tower.

It would be further desirable to have an antenna mounting system which provides safe accessibility to the antenna.

It would additionally be desirable to have an antenna mounting system which is adaptable for mounting on a wide variety of towers.

SUMMARY OF THE INVENTION

The present invention provides a system for mounting an antenna on a tower, wherein the tower has a plurality of substantially vertical leg members interconnected by a plurality of horizontal members and angled bracing members. The inventive system comprises first and second bracket members mounted to one of the tower leg members at vertically spaced locations thereon and a mounting pipe secured to the first and second bracket members so as to extend substantially vertically. A mounting frame includes upper and lower horizontal members and a plurality of connecting members secured to the upper and lower horizontal members so that the mounting frame is substantially laterally balanced. At least one of the connecting members is adapted to have the antenna secured thereto. An upper bracket member is secured to the mounting pipe and to the upper horizontal member of the mounting frame and a lower bracket member is secured to the mounting pipe and to the lower horizontal member of the mounting frame. A pair of side struts are each secured at one end to a respective connecting member of the mounting frame and are each secured at a point remote from that one end to a respective member of the tower. The connecting members to which the pair of side struts are secured are on opposite sides of the center of the mounting frame. Accordingly, the mounting frame, which is laterally balanced, can be assembled on the ground and then lifted up and secured to the mounting pipe at a desired angular orientation within a horizontal plane. The side struts secure the assembly in the desired orientation.

In accordance with an aspect of this invention, all connections to the mounting pipe are angularly adjustable about the longitudinal axis of the mounting pipe.

In accordance with another aspect of this invention, all connections to the tower leg member, the mounting pipe and the connecting members of the mounting frame are frictional in nature.

In accordance with yet another aspect of this invention, the system further includes a pair of horizontal brace members each secured at one end to the lower horizontal member. The horizontal brace members extend substantially orthogonally to the lower horizontal member and toward the tower, being on the same side of the mounting frame. A pair of angled brace members are each secured at one end to the distal end of a respective one of the pair of horizontal brace members and at the other end to a respective connecting member at a location on that connecting member which is below the lower horizontal member. A generally planar platform is provided. The platform rests on and is secured to the pair of horizontal brace members. Accordingly, a technician can stand on the platform to gain access to the antenna.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
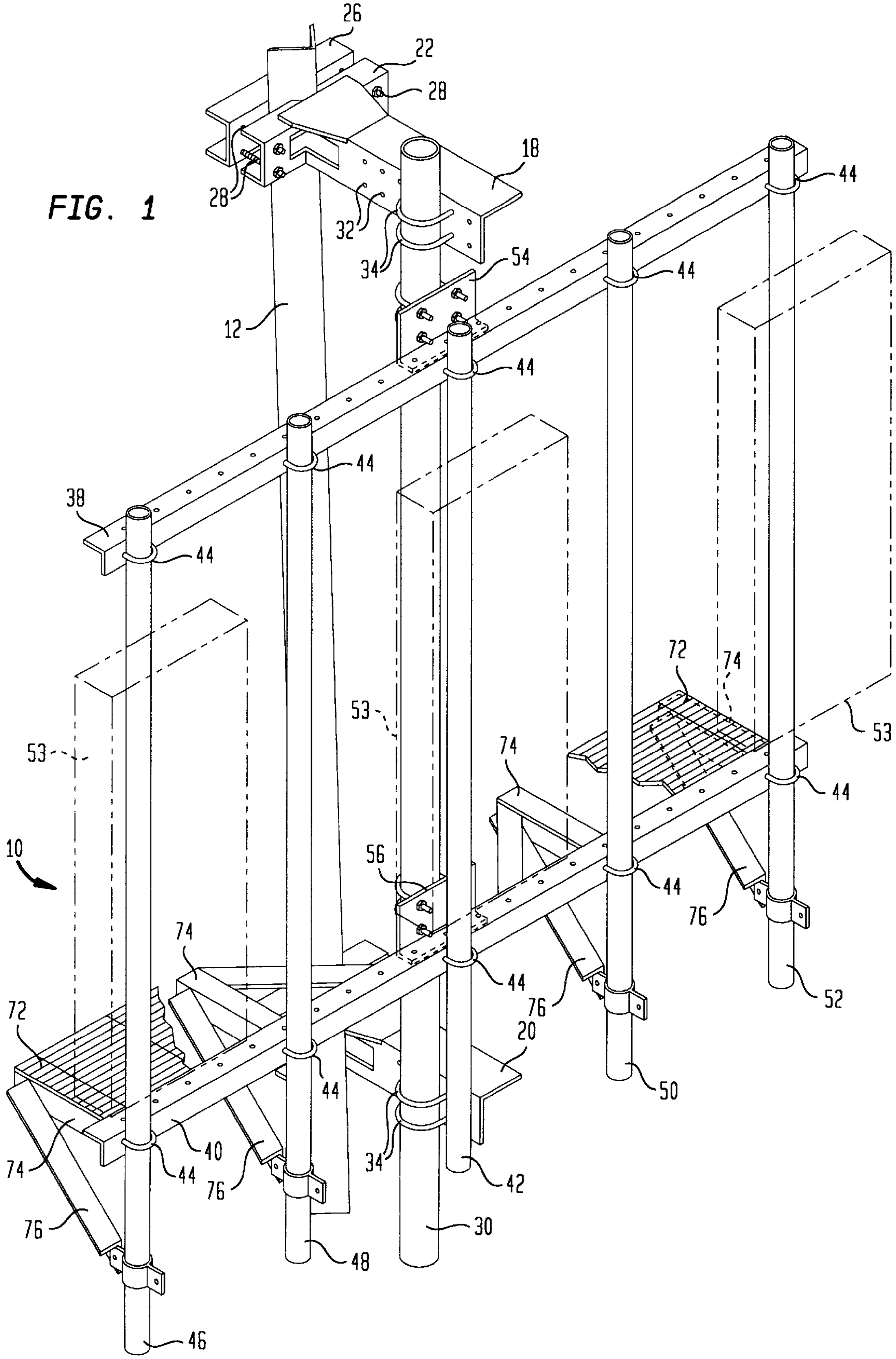
FIG. 1 is an isometric view of an antenna mounting system constructed in accordance with the principles of this invention and mounted to a tower leg.

Referring now to the drawings, FIG. 1 illustrates an antenna mounting system according to the present invention and designated generally by the reference numeral 10. The antenna mounting system 10 is mounted on the leg 12 of a tower. As shown, the leg 12 is a substantially vertically oriented angle iron, but as will be appreciated after reading the following description, the inventive antenna mounting system 10 can be used with other types of tower legs, such as, for example, cylindrical members. The tower leg 12 is connected to other similar legs by a plurality of horizontal members 14 (FIG. 5) and angled bracing members 16 (FIG. 7A), as is well known in the art.

Figure 3:
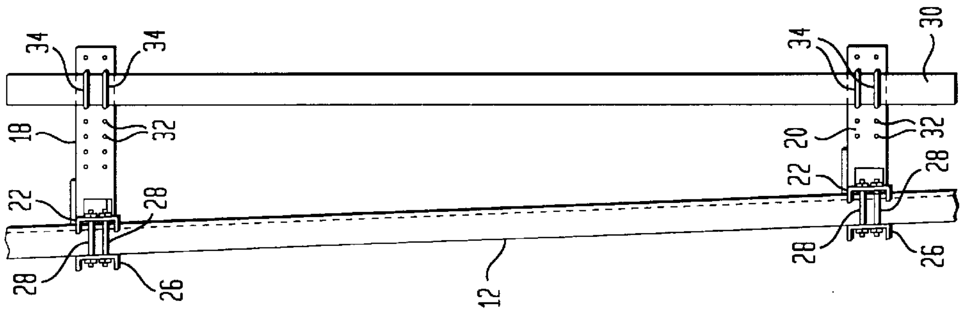
FIG. 3 is a side view showing the mounting of the mounting pipe to the tower leg.
Figure 2:
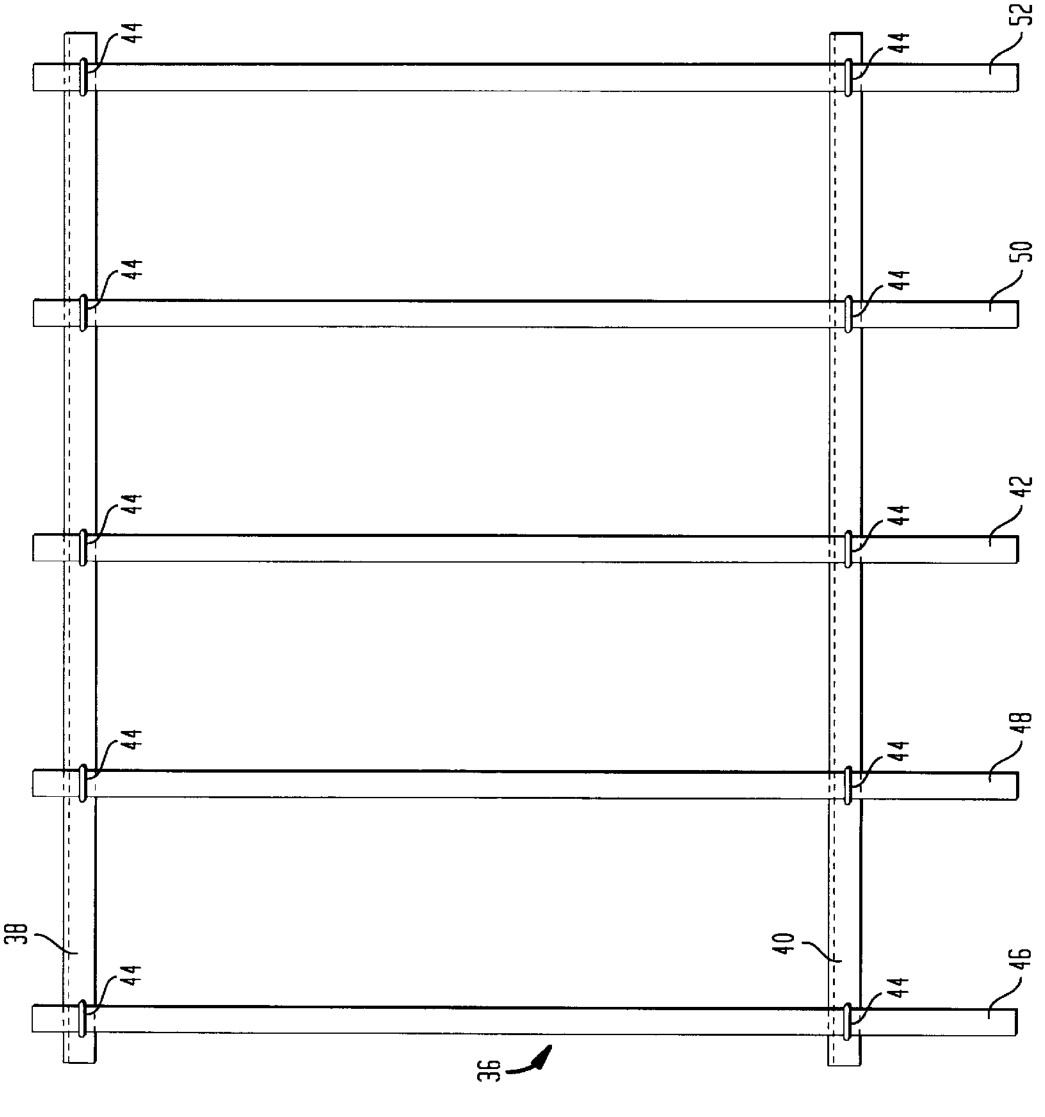
FIG. 2 is a front elevational view of a mounting frame according to the present invention.

Typically, the tower leg 12 is angled slightly from the vertical, as best shown in FIG. 3, causing the tower to narrow at greater elevations. The inventive antenna mounting system 10 includes a first bracket member 18 and a second bracket member 20 which are mounted to the tower leg 12 at vertically spaced locations thereon. As shown, the bracket member 18 is an angle iron secured at one end to a C-shaped beam 22 having a V-shaped notch 24 (FIG. 5) into which the corner of the tower leg 12 is received. A second C-shaped beam 26 is on the other side of the tower leg 12 from the beam 22. Bolts 28 extend through the beams 22, 26 and are tightened to frictionally secure the beams 22, 26, along with the bracket member 18, to the tower leg 12. The bracket member 20 is mounted to the tower leg 12 in a similar manner.

A mounting pipe 30 is provided as part of the antenna mounting system 10. The pipe 30 is secured to the bracket members 18 and 20 so as to be substantially vertically oriented. This is accomplished by providing each of the bracket members 18, 20 with a plurality of spaced holes 32 and clamping the mounting pipe to the brackets 18, 20 by means of the U-bolts 34 extending through appropriate ones of the holes 32. Thus, the mounting pipe 30 is frictionally secured to the bracket members 18, 20 and, before the U-bolts 34 are tightened by nuts (not shown), the mounting pipe 30 is rotatable about its longitudinal axis.

The antenna mounting system 10 also includes a mounting frame 36. The mounting frame 36 includes an upper horizontal member 38 and a lower horizontal member 40. The horizontal members 38, 40 preferably are equal length angle irons. In an exemplary embodiment, a central vertical pipe 42 is secured to the horizontal members 38, 40 substantially centrally thereof by the U-bolts 44. Also secured by U-bolts 44 to the upper and lower horizontal members 38, 40 are the flanking vertical pipes 46, 48, 50, and 52. Illustratively, the pipes 46, 48, 50, 52 can be identical, both as to length and diameter, to the pipe 42. In any event, there are an even number of the flanking vertical pipes 46, 48, 50, 52 and they are divided equally on both sides of the central pipe 42. All of the pipes 42, 46, 48, 50, 52 are substantially parallel to each other and orthogonal to the horizontal members 40, 42, which in turn are parallel to each other. Thus, a balanced mounting frame 36 is provided. At least one of the pipes 42, 46, 48, 50, 52 is adapted to have an antenna secured thereto. Illustratively, as shown in FIG. 1 by the broken lines, antennas 53 are secured to the pipes 46, 42 and 52, maintaining the balanced nature of the mounting frame 36.

Figure 4:
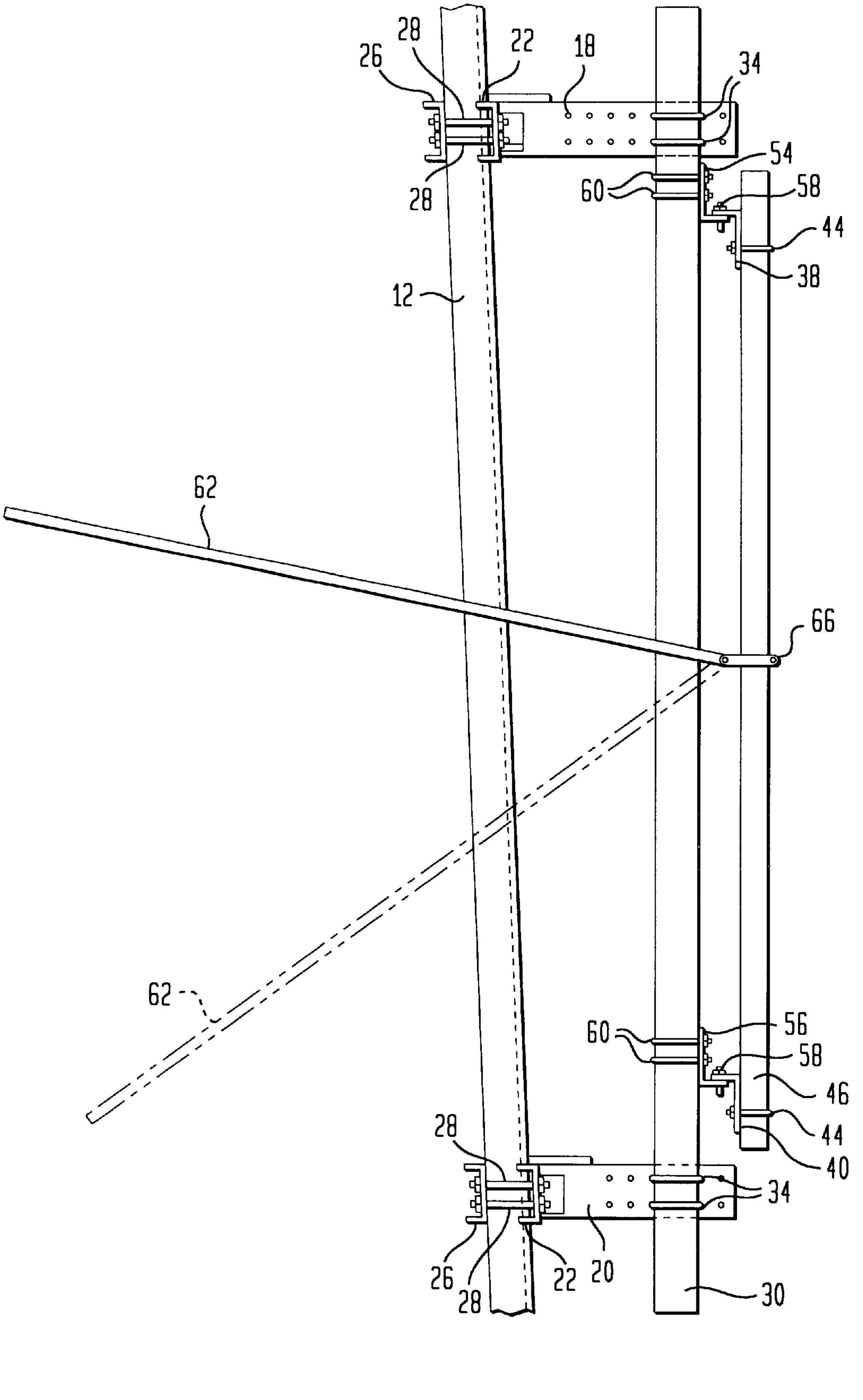
FIG. 4 is a side view showing the mounting of the mounting frame to the mounting pipe and in turn to the tower leg, and also showing a side strut, the antennas and platform not being shown.

Referring to FIG. 4, to install the mounting frame 36 on the tower leg 12, an upper bracket member 54 and a lower bracket member 56 are provided. Illustratively, the bracket members 54, 56 comprise relatively short angle irons. The bracket member 54 is placed under the upper horizontal member 38 and secured thereto as by bolts 58. Similarly, the lower bracket member 56 is placed under the lower horizontal member 40 and is secured thereto as by bolts 58. The mounting frame 36 is then mounted on the mounting pipe 30 by frictionally securing the bracket members 54, 56 to the mounting pipe 30 by means of the U-bolts 60. Before tightening the U-bolts 60, the mounting frame 36 can be angularly adjusted about the longitudinal axis of the mounting pipe 30.

Figure 5:
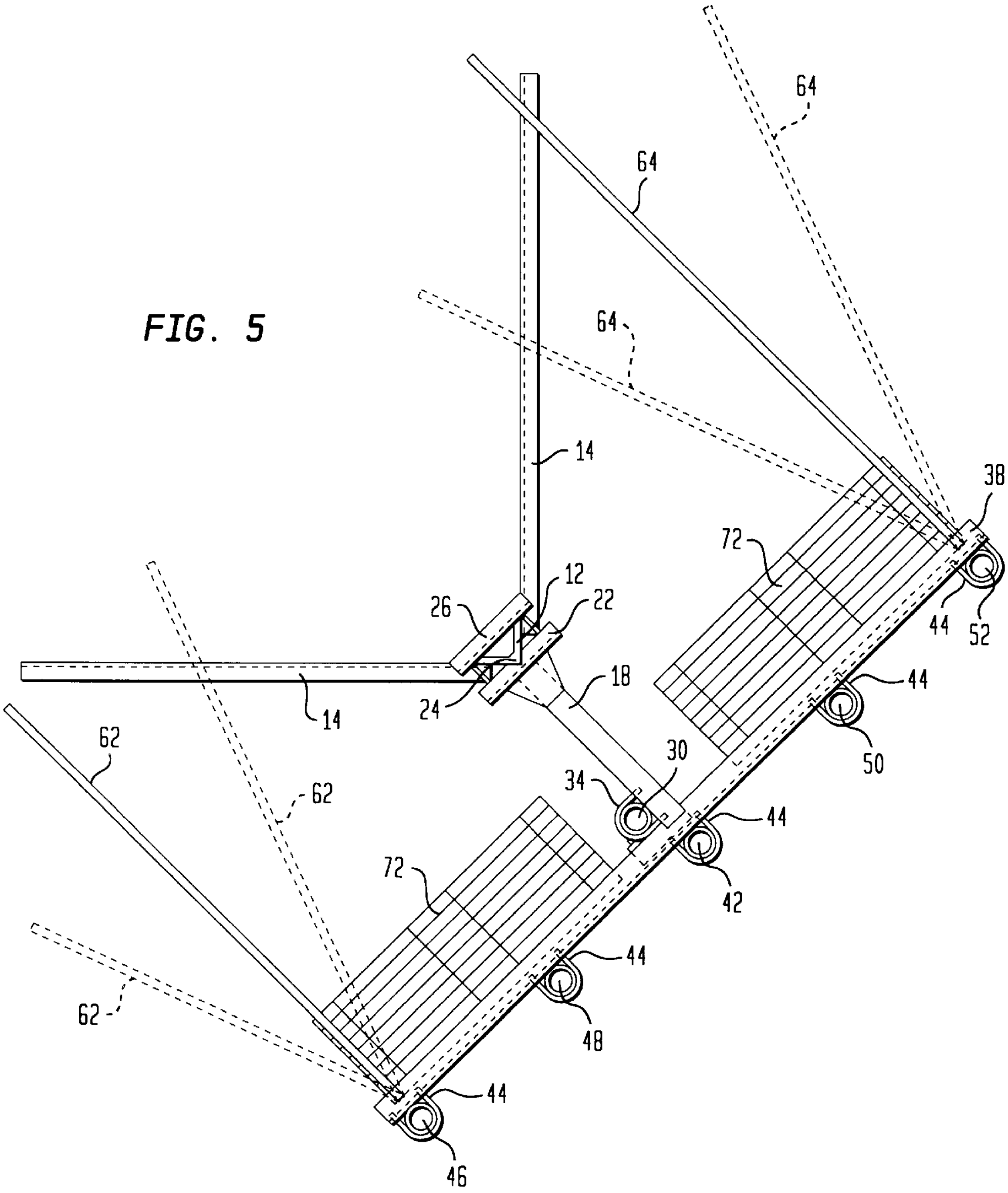
FIG. 5 is a to plan view of the antenna mounting system (without antennas) according to this invention.
Figure 6A:
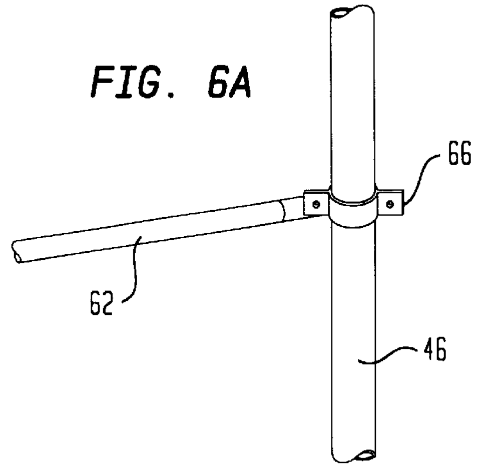
FIG. 6A is a detailed view showing a first embodiment of the mounting of a side strut to the antenna mounting frame.
Figure 6B:
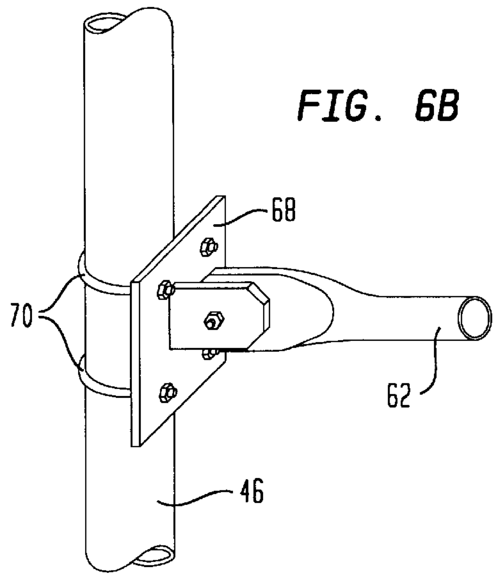
FIG. 6B is a detailed view showing a second embodiment of the mounting of a side strut to the antenna mounting frame.

Once the appropriate angular orientation (i.e., azimuth) of the mounting frame 36 is attained, the pair of side struts 62, 64 (FIG. 5) are secured to the mounting frame 36 and to the tower to maintain the angular orientation of the mounting frame 36. FIG. 6A illustrates a first embodiment of the mounting of the side strut 62 to the flanking vertical pipe 46. Thus, a clamp member 66 is secured to the pipe 46 and the side strut 62 is secured to the clamp member 66 so that it can be vertically angularly adjusted about a horizontal pivot axis, as best shown in FIG. 4. FIG. 6B shows a second embodiment of a side strut mounting arrangement which includes a hinge plate 68 secured to the pipe 46 by the U-bolts 70. The side strut 62 is secured to the hinge plate 68 so that it is vertically angularly adjustable about a horizontal pivot axis. Further, both the clamp member 66 and the hinge plate 68 are angularly adjustable in a horizontal plane about the longitudinal axis of the pipe 46 so that the side strut 62 is likewise horizontally angularly adjustable, as best shown in FIG. 5.

Figure 7A:
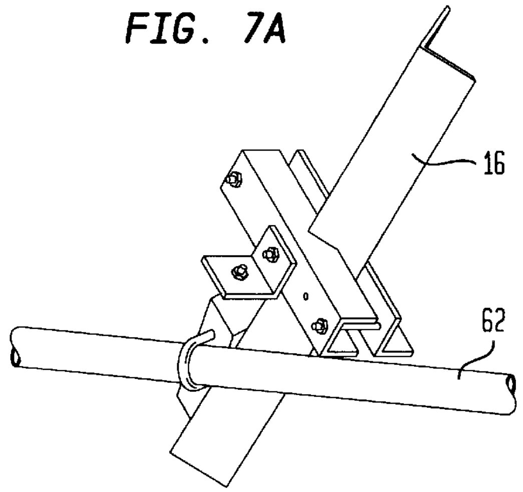
FIG. 7A is a detailed view showing a first embodiment of the mounting of a side strut to the tower.
Figure 7B:
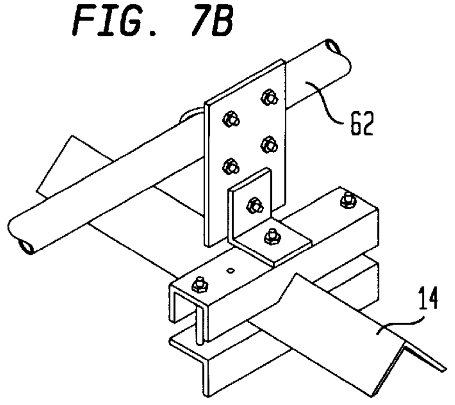
FIG. 7B is detailed view showing a second embodiment of the mounting of a side strut to the tower.

Depending upon the elevation of the mounting frame 36 on the tower, the side struts 62, 64 are secured at their distal ends to the other tower legs 12, to a tower horizontal member 14, or to a tower angled bracing member 16, preferably in that order. FIG. 7A illustrates how the side strut 62 may be secured to a tower angled bracing member 16 and FIG. 7B illustrates how the side strut 62 may be secured to a tower horizontal member 14. In both cases, the side strut 62 is held by a U-bolt and may be held anywhere along its length, to accommodate the variable effective length of the side strut 62 in accordance with the desired angular orientation of the mounting frame 36. While each of the side struts 62, 64 has been illustrated as being a unitary pipe, alternatively the side struts 62, 64 can each be constructed as a pair of overlapping sliding angles that are bolted together to effect a desired side strut length.

So that a technician may have safe access to the antennas 53 after the mounting frame 36 is secured to the tower, a generally planar platform 72 is provided. The platform 72 is supported by a pair of horizontal brace members 74 each secured at one end to the lower horizontal member 40 and extending substantially orthogonally thereto toward the tower. The pair of horizontal brace members 74 of the platform 72 are on the same side of the central vertical pipe 42. A pair of angled brace members 76 are also provided. The angled brace members 76 are each secured at one end to the distal end of a respective horizontal brace member 74 and at the other end to a respective flanking vertical pipe 46, 48, 50 or 52 at a location on that pipe which is below the horizontal member 40.

A preferred procedure for installing the antenna mounting system 10 is as follows:

1. Determine the height on the tower at which the antenna mounting system 10 is to be mounted and the particular tower leg, based on the required antenna azimuth.

2. Install the bracket members 18, 20 to the tower leg 12 as close as possible to the connection of the tower leg 12 and an angled bracing member 16 or the tower leg 12 and a horizontal member 14.

3. Secure the mounting pipe 30 to the bracket members 18, 20 in a substantially vertical orientation.

4. Assemble on the ground the mounting frame 36 including the platform 72 and the bracket members 54, 56.

5. Lift the mounting frame 36 and connect the bracket members 54, 56 to the mounting pipe 30 by the U-bolts 60 after rotating the mounting frame 36 to the required antenna azimuth.

6. Connect one end of each side strut 62, 64 around the mid point of the flanking vertical pipes 46, 52, respectively, and connect the other end of each side strut 62, 64 to a tower member, as described.

Figure 8:
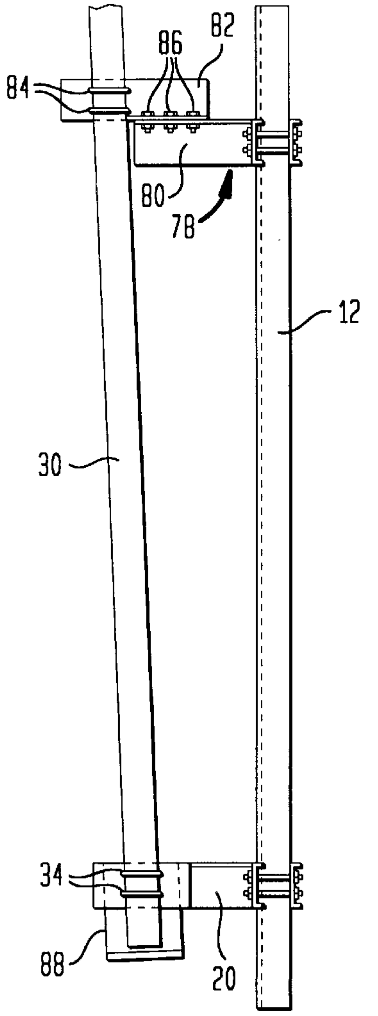
FIG. 8 is a side view showing two alternative embodiments of aspects of the mounting of the mounting pipe to the tower leg.

There may be certain antenna installations where it is desired to be able to readily adjust the angle of the mounting pipe 30 to the vertical. For example, instead of having the mounting pipe 30 vertical so that the antennas 53 are directed horizontally, certain installations require that the antennas 53 be pointed more toward the ground. Therefore, the mounting pipe 30 must be inclined from the vertical. FIG. 8 shows a modified first bracket member 78 which may be substituted for the first bracket member 18. As shown, the bracket member 78 includes a first angle iron 80 which is substantially the same as the first bracket member 18 and is secured to the tower leg 12 in substantially the same way as the first bracket member 18. A second angle iron 82 slides on the first angle iron 80 to vary the overlap therebetween. The mounting pipe 30 is secured to the second angle iron 18 by the U-bolts 84. When the desired inclination of the mounting pipe 30 is achieved by varying the overlap between the angle irons 80, 82, the angle irons 80, 82 are fastened together, illustratively by the bolts 86.

Because the mounting pipe 30 is frictionally secured to the first and second bracket members, it is possible for the mounting pipe 30 to slide downwardly, especially after the mounting frame 36 with the antennas 53 is secured thereto. To limit such movement, a support member 88 is provided. As shown in FIG. 8, the support member 88 can be an L-shaped member which is secured to the lower bracket member 20, by bolts, welding, or the like. Thus, the support member 88 has a vertically extending portion secured to the bracket member 20 and a horizontally extending portion extending below the mounting pipe 30 (out of the paper as viewed in FIG. 8). Various other constructions for the support member 88 are possible.

Accordingly, there has been disclosed an improved system for mounting an antenna on a tower. Since the majority of interconnections of structural members are frictional in nature, a wide variety of types of structural members can be utilized without requiring specialized components. While various alternative illustrative embodiments have been disclosed herein, it is understood that various modifications and adaptations to the disclosed embodiments will be apparent to one of ordinary skill in the art and it is intended that this invention be limited only by the scope of the appended claims. Thus, for example, the mounting frame can be constructed of connecting members which are oriented other than vertically.

What is claimed is:

1. A system for mounting an antenna on a tower, the tower having a plurality of substantially vertical leg members interconnected by a plurality of horizontal members and angled bracing members, the system comprising:

first and second bracket members adapted to be mounted to one of said tower leg members at vertically spaced locations thereon;

a mounting pipe secured to said first and second bracket members so as to extend substantially vertically;

a mounting frame including an upper horizontal member, a lower horizontal member substantially parallel to said upper horizontal member, and a plurality of connecting members secured to both said upper and lower horizontal members, wherein at least one of the connecting members is adapted to have the antenna secured thereto, and wherein the mounting frame is substantially laterally balanced about a balance line joining mounting points on said upper and lower horizontal members;

an upper bracket member secured to said upper horizontal member of said mounting frame at a mounting point on said upper horizontal member and to said mounting pipe;

a lower bracket member secured to said lower horizontal member of said mounting frame at a mounting point on said lower horizontal member and to said mounting pipe;

a pair of side struts each secured at one end to a respective connecting member of said mounting frame and each adapted to be secured at a point remote from said one end to a respective member of said tower, wherein said pair of side struts are secured to connecting members on opposite sides of the balance line of the mounting frame;

a pair of horizontal brace members each secured at one end to said lower horizontal member and adapted to extend substantially orthogonally thereto toward the tower, said pair of horizontal brace members being on the same side of said balance line;

a pair of angled brace members each secured at one end to the distal end of a respective one of said pair of horizontal brace members and at the other end to a respective connecting member at a location on said respective connecting member below said lower horizontal member; and a generally planar platform resting on and secured to said pair of horizontal brace members.

2. The system according to claim 1 wherein:

said mounting pipe is secured to said first and second bracket members so as to be angularly adjustable about the longitudinal axis of said mounting pipe.

3. The system according to claim 1 wherein:

said upper and lower bracket members are secured to said mounting pipe so that said mounting frame is angularly adjustable about the longitudinal axis of said mounting pipe.

4. The system according to claim 1 wherein said first and second bracket members are adapted to be frictionally secured to said one tower leg member.

5. The system according to claim 1 wherein said upper and lower bracket members are frictionally secured to said mounting pipe.

6. The system according to claim 1 wherein said connecting members are frictionally secured to said upper and lower horizontal members.

7. The system according to claim 1 wherein each of said side struts is secured to its respective connecting member so that it is angularly adjustable about both a horizontal axis and a vertical axis.

8. A system for mounting an antenna on a tower, the tower having a plurality of substantially vertical leg members interconnected by a plurality of horizontal members and angled bracing members, the system comprising:

first and second bracket members adapted to be mounted to one of said tower leg members at vertically spaced locations thereon;

a mounting pipe secured to said first and second bracket members so as to extend substantially vertically;

a mounting frame including an upper horizontal member, a lower horizontal member substantially parallel to said upper horizontal member, and a plurality of connecting members secured to both said upper and lower horizontal members, wherein at least one of the connecting members is adapted to have the antenna secured thereto, and wherein the mounting frame is substantially laterally balanced about a balance line joining mounting points on said upper and lower horizontal members;

an upper bracket member secured to said upper horizontal member of said mounting frame at a mounting point on said upper horizontal member and to said mounting pipe;

a lower bracket member secured to said lower horizontal member of said mounting frame at a mounting point on said lower horizontal member and to said mounting pipe; and a pair of side struts each secured at one end to a respective connecting member of said mounting frame and each adapted to be secured at a point remote from said one end to a respective member of said tower, wherein said pair of side struts are secured to connecting members on opposite sides of the balance line of the mounting frame;

wherein the upper one of said first and second bracket members comprises:

a first angle member adapted to be secured to said tower leg;

a second angle member secured to said mounting pipe, wherein said second angle member is slidable along said first angle member to vary the overlap therebetween in order to achieve a desired angle of inclination of said mounting pipe; and at least one fastening member securing said first angle member to said second angle member with the overlap therebetween achieving the desired angle of inclination of said mounting pipe.

9. The system according to claim 8 wherein:

said mounting pipe is secured to said first and second bracket members so as to be angularly adjustable about the longitudinal axis of said mounting pipe.

10. The system according to claim 8 wherein:

said upper and lower bracket members are secured to said mounting pipe so that said mounting frame is angularly adjustable about the longitudinal axis of said mounting pipe.

11. The system according to claim 8 wherein said first and second bracket members are adapted to be frictionally secured to said one tower leg member.

12. The system according to claim 8 wherein said upper and lower bracket members are frictionally secured to said mounting pipe.

13. The system according to claim 8 wherein said connecting members are frictionally secured to said upper and lower horizontal members.

14. The system according to claim 8 wherein each of said side struts is secured to its respective connecting member so that it is angularly adjustable about both a horizontal axis and a vertical axis.

15. A system for mounting an antenna on a tower, the tower having a plurality of substantially vertical leg members interconnected by a plurality of horizontal members and angled bracing members, the system comprising:

first and second bracket members adapted to be mounted to one of said tower leg members at vertically spaced locations thereon;

a mounting pipe secured to said first and second bracket members so as to extend substantially vertically;

a mounting frame including an upper horizontal member, a lower horizontal member substantially parallel to said upper horizontal member, and a plurality of connecting members secured to both said upper and lower horizontal members, wherein at least one of the connecting members is adapted to have the antenna secured thereto, and wherein the mounting frame is substantially laterally balanced about a balance line joining mounting points on said upper and lower horizontal members;

an upper bracket member secured to said upper horizontal member of said mounting frame at a mounting point on said upper horizontal member and to said mounting pipe;

a lower bracket member secured to said lower horizontal member of said mounting frame at a mounting point on said lower horizontal member and to said mounting pipe;

a pair of side struts each secured at one end to a respective connecting member of said mounting frame and each adapted to be secured at a point remote from said one end to a respective member of said tower, wherein said pair of side struts are secured to connecting members on opposite sides of the balance line of the mounting frame; and a support member secured to the lower one of said first and second bracket members, said support member extending below said mounting pipe to prevent said mounting pipe from sliding downwardly past said support member.

16. The system according to claim 15 wherein:

said mounting pipe is secured to said first and second bracket members so as to be angularly adjustable about the longitudinal axis of said mounting pipe.

17. The system according to claim 15 wherein:

said upper and lower bracket members are secured to said mounting pipe so that said mounting frame is angularly adjustable about the longitudinal axis of said mounting pipe.

18. The system according to claim 15 wherein said first and second bracket members are adapted to be frictionally secured to said one tower leg member.

19. The system according to claim 15 wherein said upper and lower bracket members are frictionally secured to said mounting pipe.

20. The system according to claim 15 wherein said connecting members are frictionally secured to said upper and lower horizontal members.

21. The system according to claim 15 wherein each of said side struts is secured to its respective connecting member so that it is angularly adjustable about both a horizontal axis and a vertical axis.

* * * * *